United States Patent [19]
Sawada et al.

[11] Patent Number: 5,924,106
[45] Date of Patent: *Jul. 13, 1999

[54] TAPE PRINTING DEVICE AND METHOD

[75] Inventors: Akihiro Sawada; Hideo Ueno; Yasushi Kawakami; Toshihide Fujikawa, all of Nagoya, Japan

[73] Assignee: Brother Kogyo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,646

[22] Filed: May 1, 1996

[30] Foreign Application Priority Data

May 19, 1995 [JP] Japan ..................................... 7-121173

[51] Int. Cl.⁶ ........................................................ G06F 3/14
[52] U.S. Cl. ........................................... 707/526; 707/527
[58] Field of Search ..................................... 395/779, 788, 395/789, 793, 802, 805, 139, 172; 400/61, 83, 84; 345/118, 127, 128, 130, 141, 439, 472; 707/512, 526, 527, 531, 539, 542

[56] References Cited

U.S. PATENT DOCUMENTS

| | | | |
|---|---|---|---|
| 5,066,152 | 11/1991 | Kuzuya et al. ........................ 400/621 |
| 5,188,469 | 2/1993 | Nagao et al. ........................ 400/615.2 |
| 5,341,466 | 8/1994 | Perlin et al. ............................ 395/139 |
| 5,386,218 | 1/1995 | Yano et al. .............................. 345/129 |
| 5,393,147 | 2/1995 | Ueno et al. ............................... 400/65 |
| 5,491,769 | 2/1996 | Moller ..................................... 395/139 |
| 5,503,482 | 4/1996 | Kawakami et al. ..................... 400/83 |
| 5,504,853 | 4/1996 | Schuur et al. ......................... 396/356 |
| 5,617,114 | 4/1997 | Bier et al. .............................. 345/113 |
| 5,652,901 | 7/1997 | Slayden et al. ........................ 395/789 |

FOREIGN PATENT DOCUMENTS

| | | |
|---|---|---|
| A-0-577-247 | 1/1994 | European Pat. Off. . |
| A-0-656-594 | 6/1995 | European Pat. Off. . |
| A-0-695-643 | 2/1996 | European Pat. Off. . |
| A-0-606-768 | 7/1994 | Japan . |

OTHER PUBLICATIONS

Simpson, *Mastering WordPerfect® 5.1 & 5.2 for Windows*™, Sybex Corporation, 1993, pp. 5, 6, 19, 38–43, 71, 72–73, 138–145 and 1162.

IBM Technical Disclosure Bulletin, "Electronic Magnifying Glasses," vol. 37, No. 3, Mar. 1994, pp. 353–354.

*Primary Examiner*—Stephen S. Hong
*Attorney, Agent, or Firm*—Oliff & Berridge, PLC

[57] ABSTRACT

A data processing device and method permit improved display of data and characters on a display. When an enlargement display key is input after designating characters, a line or block, on the enlargement display flag signal is indicated. The device and method permit the displayed data to be have its size increased on a display screen so as to be equal to the size to be printed. However, if the size to be printed is too small to be clearly viewed, the data on the display screen can be enlarged and an appropriate signal is displayed on the display.

28 Claims, 15 Drawing Sheets

Fig. 11

| CODE | X POSITION | Y POSITION | CHARACTER WIDTH | FORMAT DATA | POINTER |
|------|------------|------------|-----------------|-------------|---------|
| A | X1 | Y1 | W1 | FORMAT DATA 1 | 2 |
| B | X2 | Y2 | W2 | FORMAT DATA 1 | 4 |
| C | X3 | Y3 | W3 | FORMAT DATA 1 | 6 |
| D | X4 | Y4 | W4 | FORMAT DATA 1 | 8 |
| E | X5 | Y5 | W5 | FORMAT DATA 2 | 14 |
| F | X6 | Y6 | W6 | FORMAT DATA 2 | 16 |
| G | X7 | Y7 | W7 | FORMAT DATA 2 | 18 |

SP → 0
12
24
36
48
60
72
EP → 84

LAYOUT POSITION INFORMATION FOR ONE CHARACTER = 12 BYTES

Fig. 12

| PRINT CHARACTER SIZE (dot) | CHARACTER SIZE IN NORMAL DISPLAY (dot) | CHARACTER SIZE IN ENLARGEMENT DISPLAY (dot) |
|---|---|---|
| 16 | 7 | 10 |
| 24 | 7 | 16 |
| 32 | 10 | 24 |
| 48 | 16 | 32 |
| 64 | 24 | 32 |
| 96 | 32 | 32 |

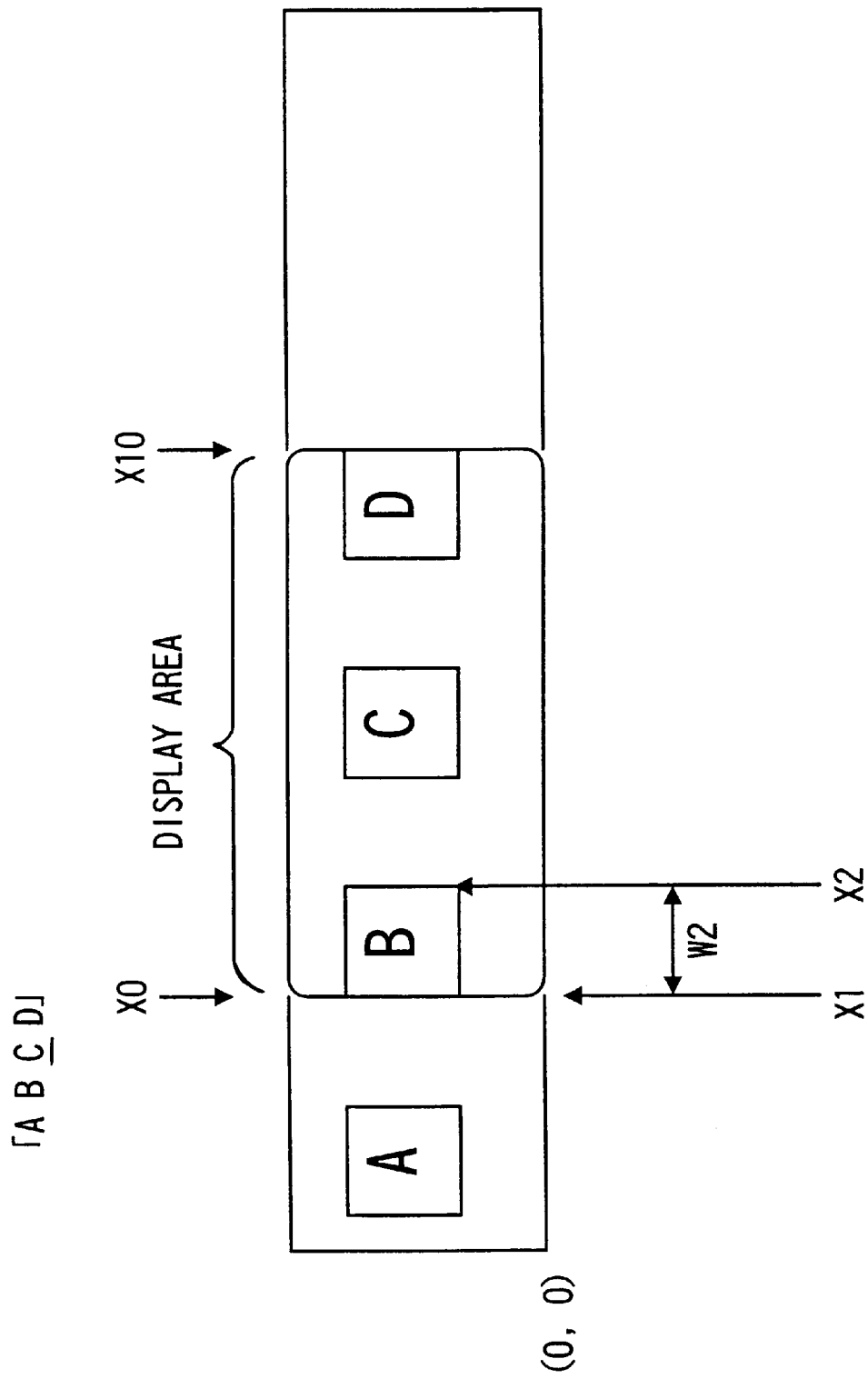

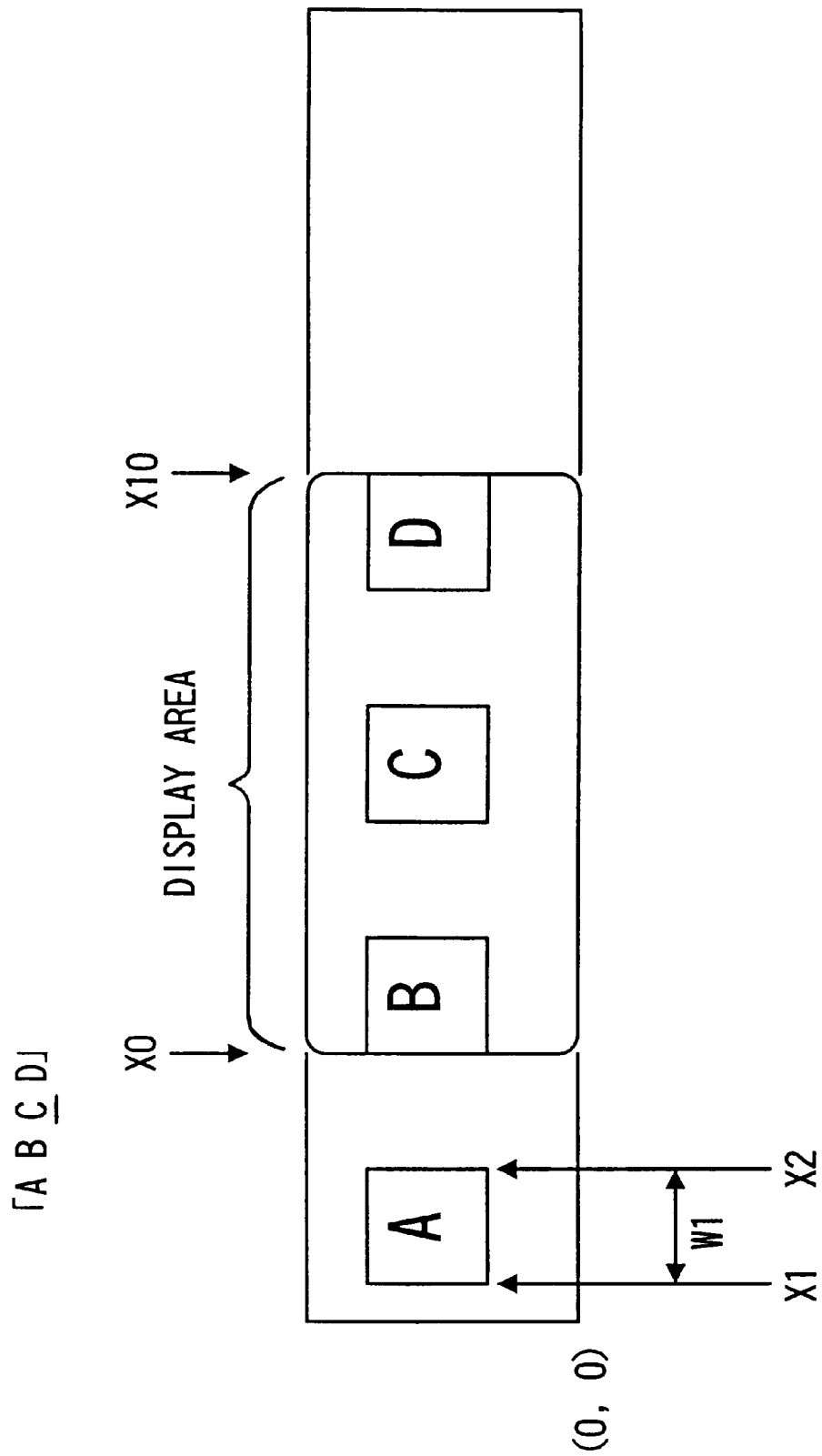

TAPE PRINTING DEVICE AND METHOD

BACKGROUND OF THE INVENTION

1. Field of the Invention

This invention relates to a data processing device, which includes an improved display function on a display screen.

2. Related Art

A data processing device can make tape labels for attaching to a front page of a file. A known data processing device includes a keyboard, a display screen and a print mechanism for printing alphanumeric and symbolic characters on tapes. The tapes have various widths, for example 6, 9, 12, 18, and 24 mm. The data processing device can have various editing functions, as described in U.S. Pat. No. 5,066,152.

The widths of tapes used in the data processing device can be changed by exchanging tape cassettes. The size of characters printed on a tape will be accordingly selected based on the tape width.

SUMMARY OF THE INVENTION

The data processing device in accordance with the invention comprises a display function that displays substantially the same print image of characters on the display screen, as that which is printed on the tape when a predetermined display mode is selected.

Conventional data processing devices are not designed to change the size of the print image characters displayed on the display screen. Therefore, when a plurality of lines were to be printed, the print image characters on the display screen become small. It is difficult to confirm the characters on the display screen.

An object of this invention is to provide a data processing device that is capable of enlarging the image data characters displayed on the display screen. To achieve the above and other objects, a data processing device comprises input means for inputting alphanumeric and symbolic characters and various commands, data memory means for storing data of input characters, a display means for displaying characters, font memory means for storing pattern data for a plurality of characters, a display data buffer means for storing image data to be displayed on the display screen, and display control means for controlling the display means in response to display of the image data read from the display data buffer.

The data processing device further includes image data generation means for generating display image data for characters stored in said data memory means for displaying characters on said display screen the same as a print image, size setting means for setting an enlargement display size to be displayed on said display screen, enlargement area setting means for designating an area to be enlarged, and enlargement image data generation means for generating enlargement display image data for displaying the characters of the designated area in the enlargement size which is set by said size setting means.

According to another object of the data processing device including the above features, the image data generation means generates display image data, which has substantially the same size as the print image. The display image data is stored in the display data buffer means, and is based on the display image data. The display control means displays characters on a display screen in the same way of the image printed on the tapes. Moreover, the enlargement image data generation means generates enlarged display image data to display the characters in the area designated by an enlarged area, which is set by the size setting means. This enlarged display image data is stored in the display data buffer means, and is based on this display image data. The display control means displays the characters in an enlarged size on the display screen.

The data processing device is designed to enlarge the display character size. The operation of the device is improved from conventional devices because the display character size can be enlarged if it is displayed too small on the display screen. Moreover, according to the invention it is easy to recognize whether the enlarged display on the display screen is shown from the beginning or the middle of data.

BRIEF DESCRIPTION OF THE DRAWINGS

FIG. 11 is a diagram of layout position information;

FIG. 12 is a character size convert table for preset relationship between print character size and display character size;

FIG. 16 is a diagram illustrating a middle of a line in enlarged display; and FIG. 17 is a diagram illustrating a middle of a line in enlarged display.

DESCRIPTION OF THE PREFERRED EMBODIMENTS

A first preferred embodiment of a tape printing apparatus will be described with reference to the drawings. The tape printing apparatus can print alphabetic, numeric and symbolic or other characters on tapes.

Figure 1:
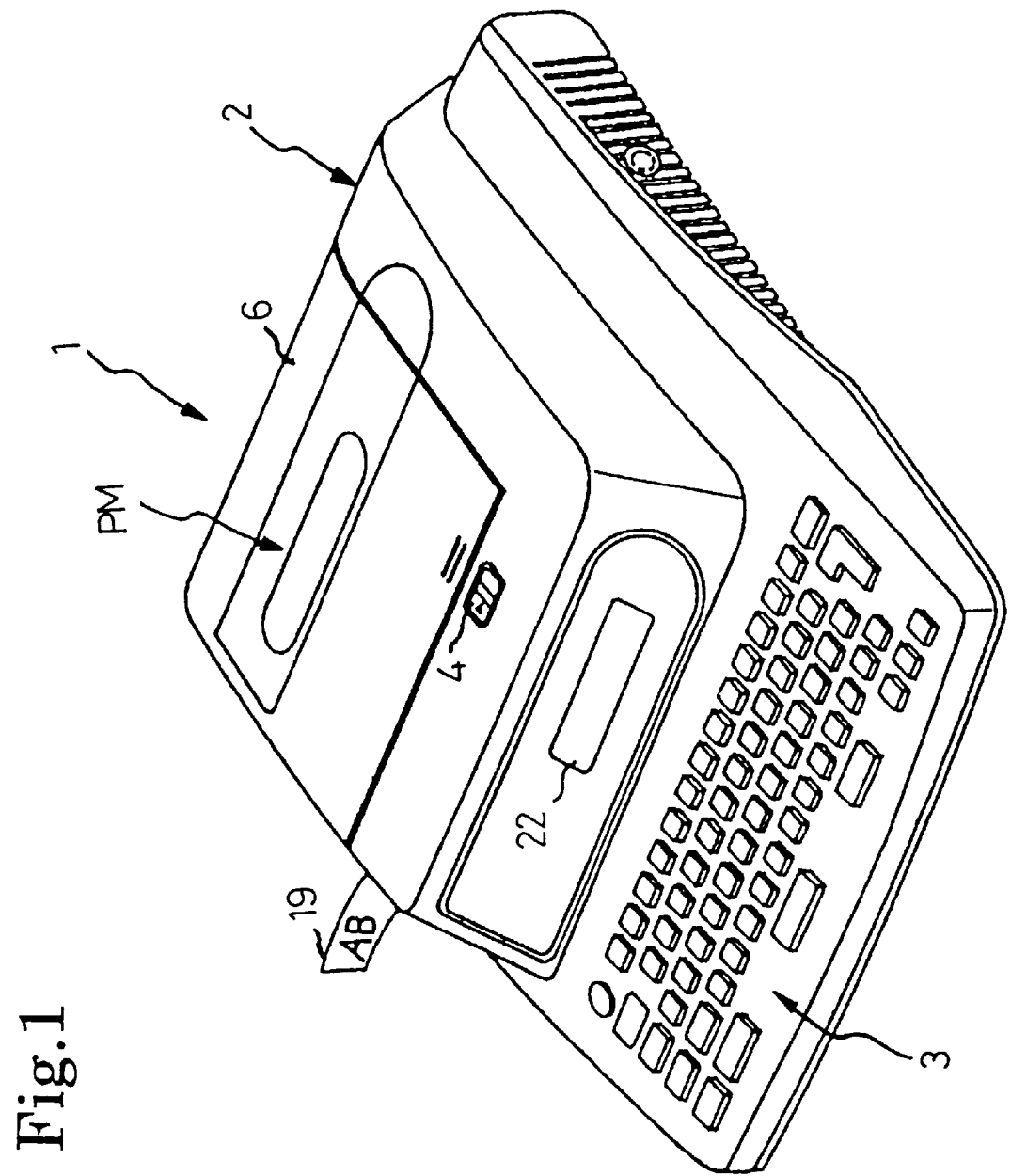
FIG. 1 is a perspective view of the data processing device.

In FIG. 1, a data processing device 1 includes a keyboard 3 located at a front portion of a main frame 2. A printing mechanism PM is positioned inside of the main frame 2. A liquid crystal display (LCD) 22 is positioned on the back side of the keyboard 3 to display the print image of the input characters and symbols. The display 22 comprises a display screen, for example a display screen having 32 dots vertically and 121 dots horizontally. A release button 4 releases a top cover 6 which permits attaching or detaching a tape cassette CS to/from the printing mechanism PM.

The keyboard 3 can include character keys for inputting alphabets, numbers and symbols; a space key; a carriage return (CR) key; cursor up/down/right/left keys; a display size setting key; a format setting key for changing format data including character decoration, display character size and print character size; a confirm key for completing a variety of settings; a print key for starting print operation and a power key for turning the power on and off.

The printing mechanism PM will be described with respect to FIG. 2. A detachable rectangular tape cassette CS is attached to the printing mechanism PM. This tape cassette CS has a tape spool 8 loaded with a laminate film tape 7. A ribbon supply spool 10 is loaded with a print ribbon 9. A take-up spool 11 winds the used print ribbon 9.

A supply spool 13 is loaded with a double-sided adhesive tape 12 having the same or similar width as the laminate film tape 7. The double-sided adhesive tape 12 is wound around the supply spool 13, with its separation paper directed exteriorly. A rotatable joining roller 14 joins the double-sided adhesive tape 12 and the laminate film tape 7.

A thermal print head 15 is disposed on the printing mechanism PM, where the laminate film tape 7 and the print ribbon 9 overlap each other. A support member 18 is attached pivotally on the main frame 2. A platen roller 16 is supported rotatably on the support member 18 and presses the laminate film tape 7 and the print ribbon 9 onto the print head 15. A feed roller 17 presses the laminate film tape 7 and the double-sided adhesive tape 12 onto the joining roller 14 to complete a print tape 19. The thermal print head 15 can comprise a vertical alignment of heating elements, for example 128 heating elements.

In operation, a tape feed motor 45 (FIG. 3) synchronously drives the joining roller 14 and the take-up spool 11 in a predetermined direction, when the heating elements of the print head 15 are selectively energized. Thus, the desired characters, for example a bar code, are printed on the laminate film tape 7 with a plurality of dots. The print tape 19 comprises the laminate film tape 7 and the double-sided adhesive tape 12 adhered thereto. The print tape 19 is transported in the direction indicated by arrow A, in FIG. 2 and is drawn out of the main frame 2, as shown in FIGS. 1 and 2. U.S. Pat. No. 5,188,464 provides a detailed description of the printing mechanism PM.

Figure 2:
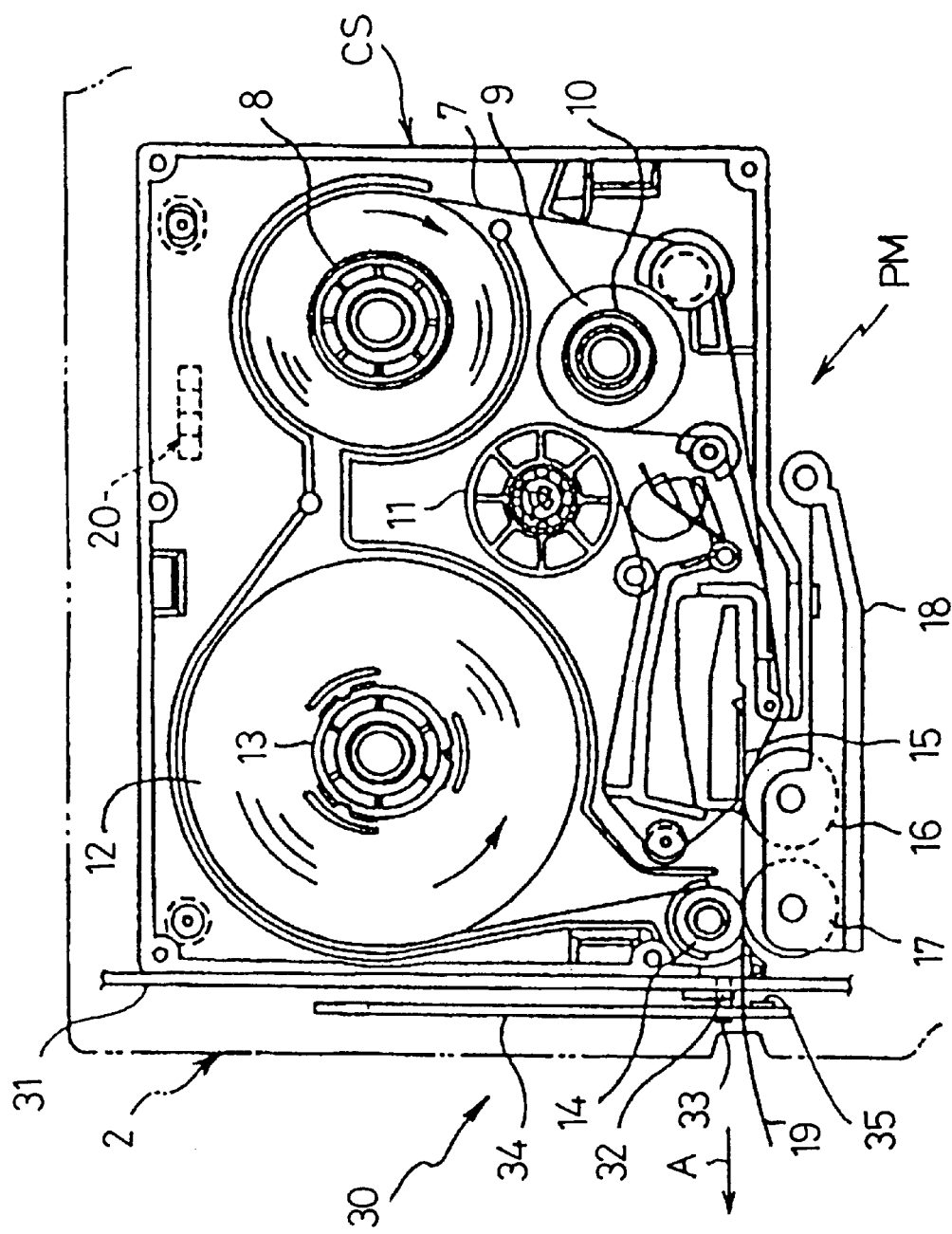
FIG. 2 is a plane view illustrating a printing mechanism with a tape cassette being mounted on the printing mechanism.

Next, a print tape cutting device 30 for cutting the print tape 19 will be briefly explained, with reference to FIG. 2. Inside the main frame 2, a subsidiary frame plate 31 is positioned in contact with the left-hand side of the tape cassette CS. A fixed cutter 32 is facing the print tape 19 and is attached to the subsidiary frame plate 31. An operation lever 34 extends between the front and the rear portions of the cassette CS, and is pivotally installed on a pivot 33, which is fixed in the lateral direction on the subsidiary frame plate 31.

A movable cutter 35 is attached to the operation lever 34 at the front side of the pivot 33 in a confronting relation the fixed cutter 32. The operation lever 34 is connected at its rear end with a swing drive mechanism (not shown) which in turn is connected with a tape cutting motor 46 (shown in FIG. 3). Thus, the operation lever 34 can be driven by the motor 46 and vertically swung. The operation lever 34 is positioned so the moving cutter 35 is spaced from the fixed cutter 32.

The print tape 19, after printing is conducted by the print head 15, is fed out of the tape cassette CS and the main frame 2 between the fixed cutter 32 and the moving cutter 35. When the tape cutting motor 46 is activated by a cutting signal, the rear end of the operation lever 34 is vertically swung by swing drive mechanism. The moving cutter 35 cooperates with the fixed cutter 32 and cuts the print tape 19.

Figure 3:
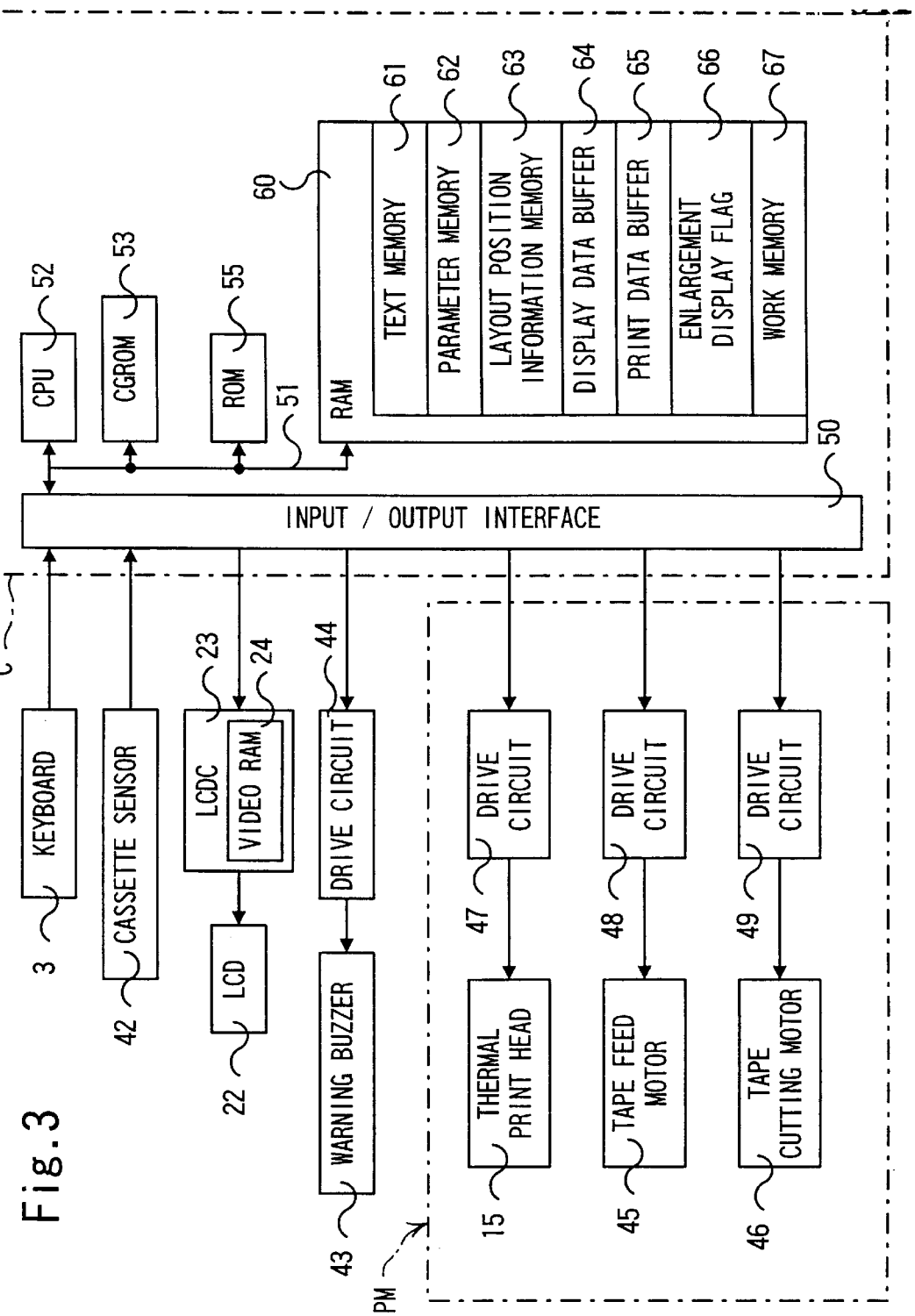
FIG. 3 is a block diagram of the control system of the data processing device.

The control system of the data processing device 1 will be explained, with reference to FIG. 3. An input/output interface 50 is connected to the keyboard 3, a cassette sensor 42, a display controller (LCDC) 23. The controller 23 includes a video RAM 24 to provide display data to the liquid crystal display (LCD) 22, a drive circuit 44 for an alarm 43, such as a warning buzzer, a drive circuit 47 for the thermal print head 15, a drive circuit 48 for the tape feed motor 45, and a drive circuit 49 for the tape cutting motor 46.

A controller C comprises a CPU 52, the input/output interface 50, which is connected to the CPU 52 via a bus 51, a CGROM 53 (character generator ROM), a ROM 55, and a RAM 60.

Figure 13:
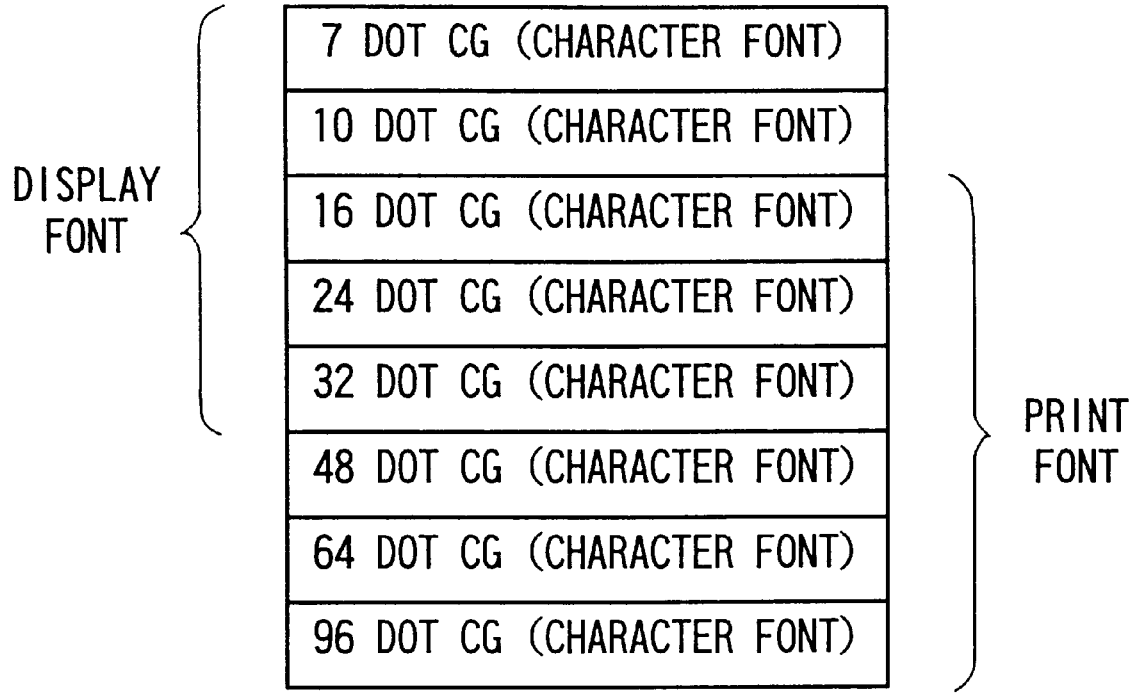
FIG. 13 is a table illustrating the character sizes of character font stored in CGROM.

The CGROM 53 stores display/print dot pattern data, for example font data for alphabetic, numeric and symbolic characters, as shown in FIG. 13. The display/print dot pattern data for each character is stored for each of several character types (such as Italic, Gothic) and for each of eight sizes (7, 10, 16, 21, 24, 32, 48, 64 and 96 dots) corresponding to code data, as shown in FIG. 13.

The ROM 55 stores a tape printing control program for displaying characters input by the keyboard 3 on the display 22, and for printing the displayed characters on tapes. A print drive control program sequentially reads data out of the print data buffer 65, and drives the thermal print head 15 and the tape feed motor 45. A character size change table is also stored in the ROM 55 to set a relation between print character size and display character size, as shown in FIG. 12.

A RAM 60 includes a text memory 61; which stores text data input by the keyboard 3; a parameter memory 62, which stores a start address pointer value SP indicative of the starting address of the text memory 61; an end address pointer value EP indicative of the end address of the text memory 61 and the data count value DC; and a layout position information memory 63, which stores information of the print position in a print data buffer 65 for the characters to be printed.

Figure 9:
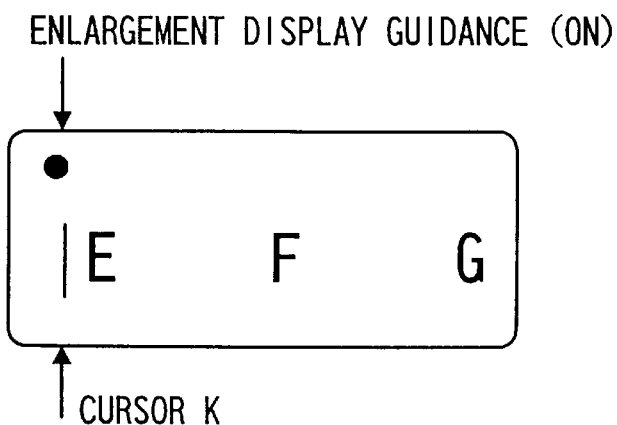
FIG. 9 is a diagram illustrating an example of a display for an enlargement display mode.

The RAM 60 also includes a display data buffer 64, which stores display dot image data comprising synthesized display dot pattern data of the input characters; a print data buffer 65, which stores print dot image data comprising a synthesized print dot pattern data for characters to be printed; and an enlargement display flag 66, which indicates whether the display is in a normal display mode or an enlargement display mode. RAM 60 stores the enlargement display flag 66 as OFF in an initial setting for indicating a normal display mode. Each time the display size setting key is operated, the enlargement display flag 66 changes between ON and OFF, and an appropriate changed flag is stored therein. When the enlargement display flag is ON, enlargement display guidance indication is displayed on the display 22, as shown in FIG. 9 to indicate to users that the current display is in the enlargement display mode. RAM 60 also comprises a work memory 67.

Figure 4:
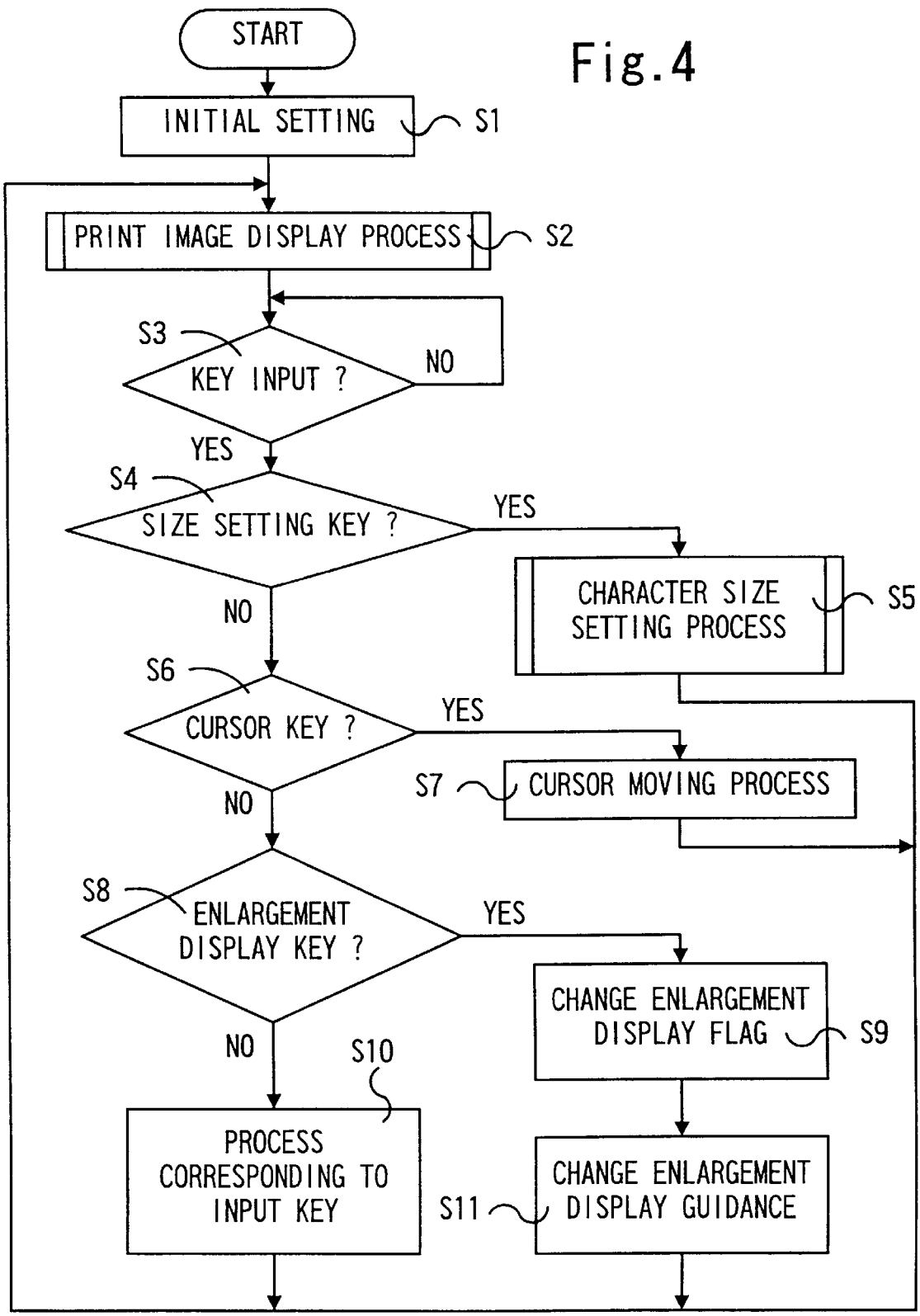
FIG. 4 is a flowchart showing a main process of tape print control.
Figure 5:
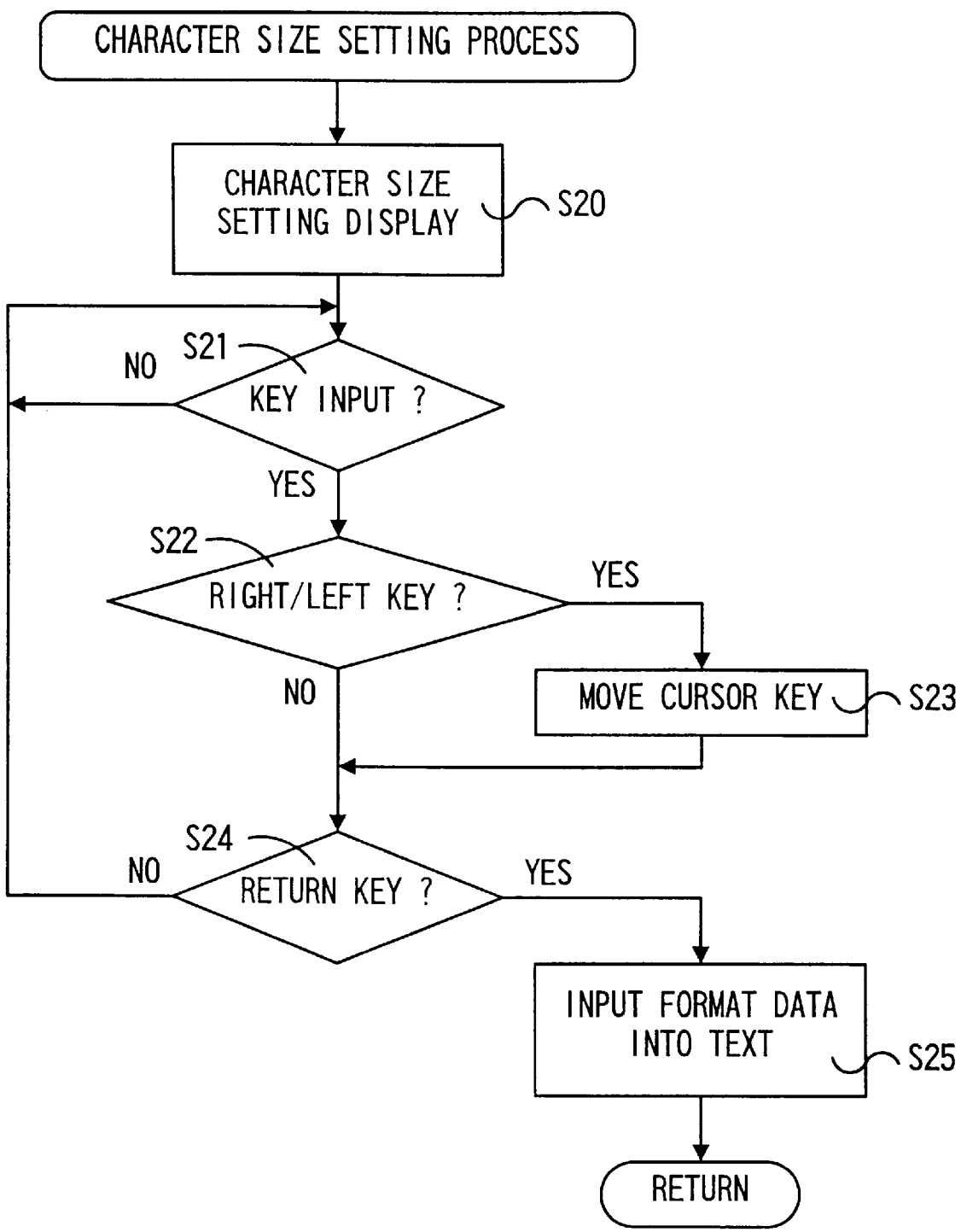
FIG. 5 is a flowchart of a character size setting process.

The operation of the data processing device 1 will be described with reference to FIGS. 4–6. The symbols Si (i=1, 2, 3 . . . ) in these figures represent each step.

When the power key on the keyboard 3 is turned on, the control is initiated. The memories 61–67 in RAM 60 are cleared, and the initializing of the printing mechanism PM is carried out in step S1. Standard format data is stored in the leading two bytes of the text memory 61, and a text input mode display is shown on the display screen 22. The cursor K displays display character size, corresponding to the print character size of a standard format data, on the text input mode display.

Next, a print image display process step S2 is carried out to display a print image of characters and symbols stored in the text memory 61. This print image display process will be described hereinafter.

After the initializing process step S1, the process determines if a key has been input in step S3 and if the inputted key is the size setting key, in step S4. If the size setting key is input in step S4, a character size setting process step S5 is conducted.

Figure 7:
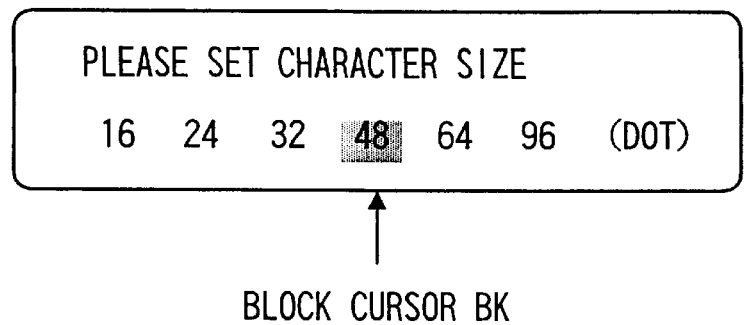
FIG. 7 is a character size setting screen display.

The character size setting process step S5 is explained with reference to FIG. 5. In the character size setting process, in step S20, the character size setting mode display appears on the display screen 22, as shown in FIG. 7. After the character size setting display appears, the process determines if a key has been input in step S21, and in step S22 if the inputted key is the cursor right/left keys. If the cursor right/left key is input in step S22, the block cursor BK is moved to the size of characters to be set in step S23. Conversely, the return key is input if the cursor right/left key is not input.

The character size where the block cursor key is positioned is selected as a print character size SZ. The format data, which contains this print character size SZ, is stored at the cursor position in the text memory 61 as the renewed format data in step S25. The print character sizes can include 16, 24, 32, 48, 64, and 96 dots. After the print character size is set, the process returns to the print image display process step S2, shown in FIG. 4.

Figure 8:
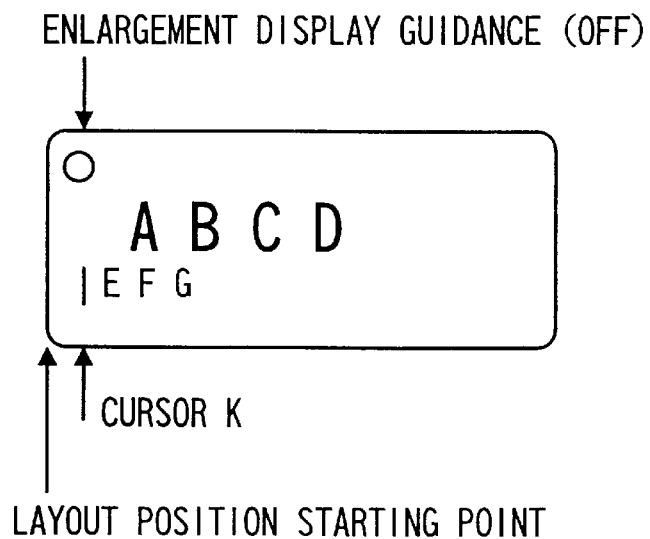
FIG. 8 is a diagram illustrating a display for a standard display mode.

If the cursor key is input, i.e., YES in step S6, after the initial setting process, a cursor moving process is carried out in step S7. The cursor K is displayed with its vertical line on the left side of the characters, with the cursor located as shown in FIG. 8. During the cursor moving process, the cursor K is moved to the location corresponding to the input cursor key.

If the enlargement display key is input, i.e., YES in step S8, the changing the enlargement display flag is changed in step S9, and an enlargement display guidance is conducted in step S11. When the enlargement display flag KF is ON, the characters aligned with the cursor K are displayed with an enlarged size as shown in FIG. 9 in the print image display process step S2. At the same time, the enlargement display guidance is shown on the display. When the enlargement display flag KF is OFF, the characters aligned with the cursor K are displayed in a standard size, and the enlargement display guidance is not shown, as shown in FIG. 8.

Since the enlargement display flag KF is OFF at the initial setting process, the display mode is the standard display mode. Whenever the enlargement display key is operated, the enlargement display flag KF changes from ON to OFF or from OFF to ON, and the display mode also changes either from the standard display mode to the enlargement display mode, or from the enlargement display mode to the standard display mode.

When keys, except the size setting key, such as the cursor moving keys and the enlargement display key are operated, the process corresponding to each operated key is carried out in step S10. For example, if at least one printable key, such as alphabetical character key, symbolic key or numerical key is input, the character code data corresponding to the operated printable key is stored in the text memory 61 as document data. The process returns where the print image display process control is carried out in step S2.

If the print key is input, the print process is carried out and the process returns to step S2. The following is an explanation of the print process of step S10. The format data or character codes are sequentially read from the text memory 61, and the layout position information for printing is determined (FIG. 11). The layout position information includes, for each print character: codes; an X position; a Y position; character width; and format data. Based on this information, the print dot pattern data in CGROM 53 is read, loaded as read print dot pattern data in the print data buffer 65, combined and stored therein. The print dot image data for the print data buffer 65 is loaded in the print mechanism PM, and subsequently printed on a print tape 19.

Figure 10:
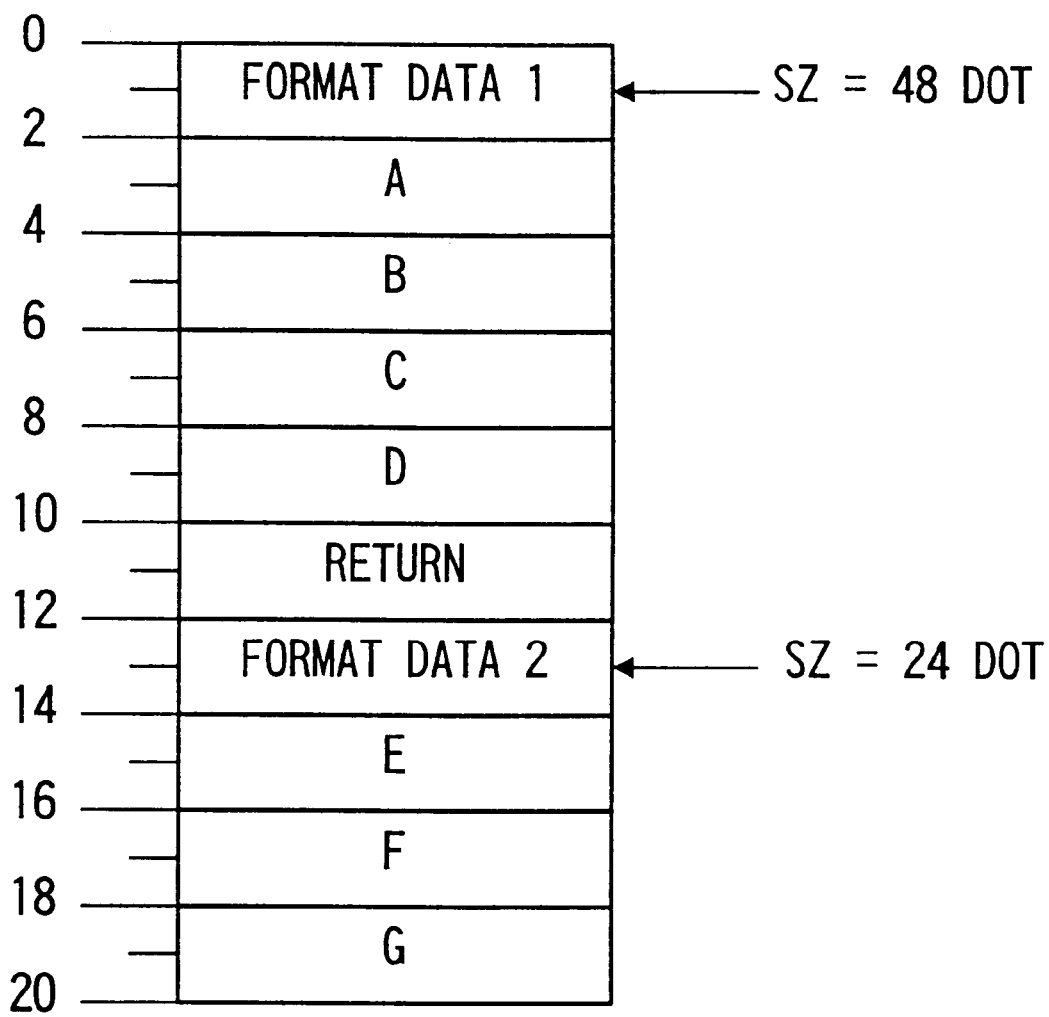
FIG. 10 is a diagram explaining the text memory storing format data and character codes.

The print image display process of S2 will now be described, based on the text memory 61 successively storing format data 1, characters "ABCD," CR codes, format data 2 and characters "EFG", as shown in FIG. 10.

Figure 6A:
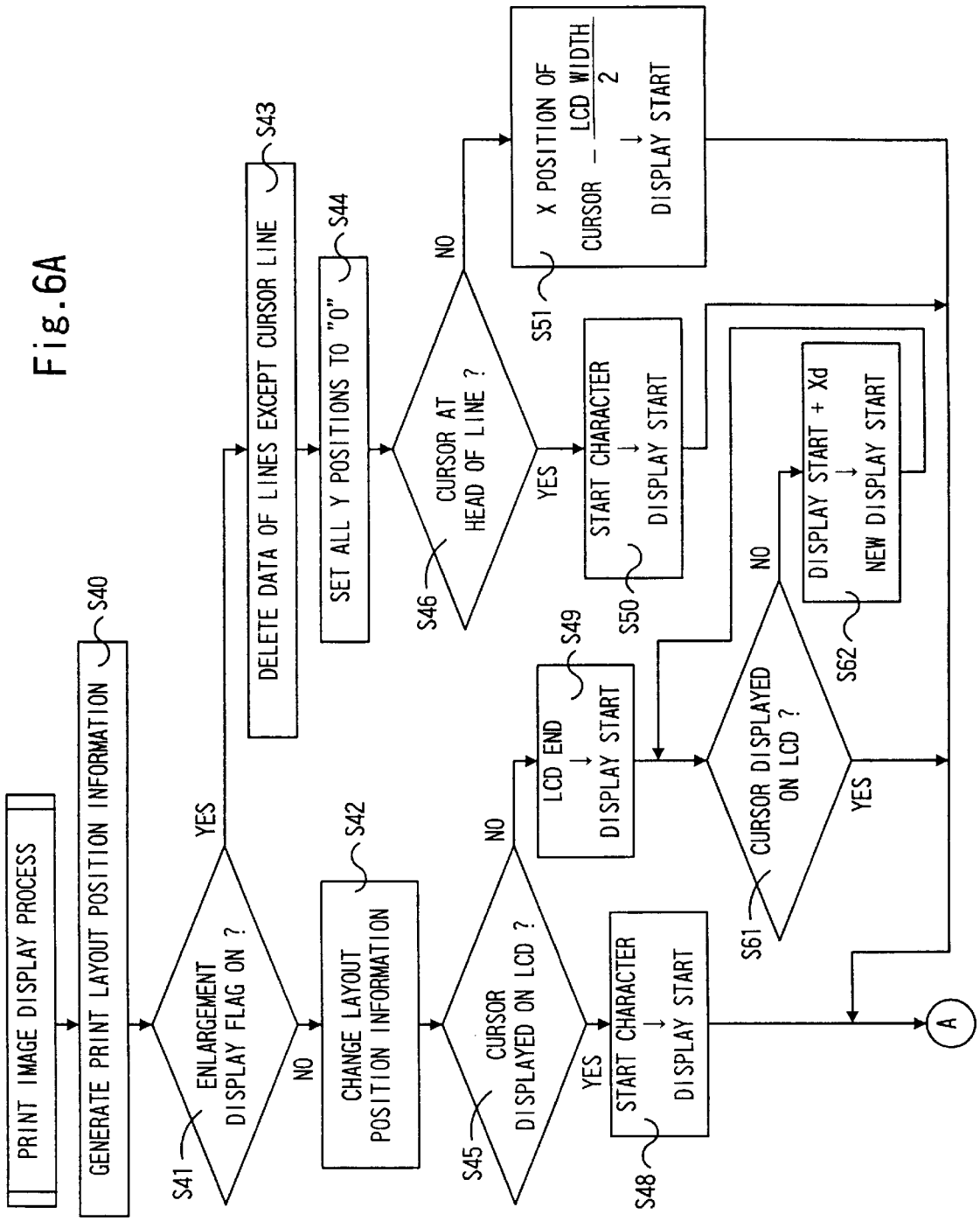
FIG. 6A is a flowchart of a print image display process.
Figure 6B:
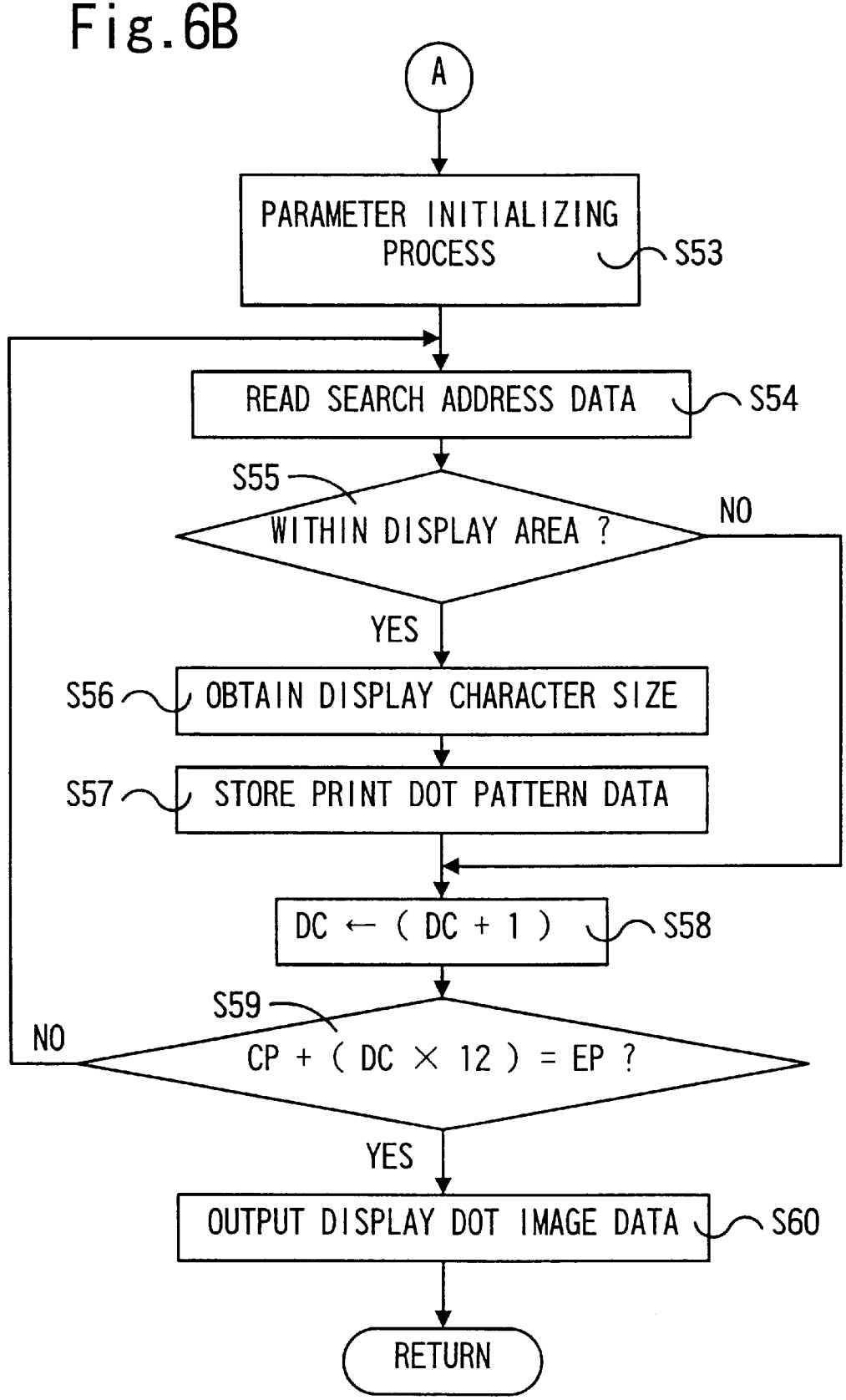
FIG. 6B is a continuation of the flowchart of the print image display process.

In FIGS. 6A and 6B, when the print image display process starts, the data is initially sequentially searched from the text memory 61 from a starting address. For each character or symbol to be printed, the print layout position information for developing the print dot pattern data in the print data buffer 65 is determined based on the format data, character codes and CR codes. Thereafter, the determined layout position information is stored in step S40 in a layout position information memory 63. The print layout position information is determined from the format data, character codes, CR codes and print dot pattern data (FIG. 11). The X and Y positions of the layout position information are determined for each of the X and Y axis as the abscissas axis and the ordinates axis, respectively.

The process of converting the layout position information at printing into the layout position information at display will now be described. When the enlargement display flag is OFF in step S41, the print layout position information is converted to display layout position information for a normal display mode. For example, if the print height is 96 dots and the display height is 32 dots, i.e., the ratio between the size of a character to be printed and the size of a display is 3:1. The X and Y positions and character width for all the print layout position information, shown in FIG. 11, are multiplied by one third. The display layout position information, corresponding to the data stored in the text memory 61, is determined in step S42.

However, if the enlargement display flag is ON, i.e., YES in step S41, the print layout position information is converted to layout position information for an enlargement display mode. Here, data for other lines, except the line with cursor, are deleted in step S43, to generate the display layout position information for the data included in the line with cursor. Since the pointer information (FIG. 11), which indicates the relation with the text memory 61, is included in the print layout position information, the data or information to be deleted can be determined. After the data has been deleted in step S43, Y positions of the layout position information corresponding to the data of the line with cursor are reset or renewed to zero in step S44, thus displaying the data of the line with cursor at a lowest line.

The determining of the display area, based on the cursor position and the width of the display screen, will now be described. If the enlargement display flag is OFF, i.e., NO in step S41, the cursor K can be displayed on the display screen when displaying from the beginning of the text, i.e., YES in step S45. The X position of the character at the beginning of the text is defined in step S48 as the X position at the beginning of the display area.

However, if the cursor K cannot be displayed on the display screen when displaying from the beginning of the text in step S45, the X position Xd at the right edge of the display screen 22, which shows the rear end of the display screen, is defined in step S49 as the X position for the beginning of the display area. When the X position Xd at the right edge of the display screen is represented as the X position, the process determines in step S61 whether the cursor K is displayable within the display screen. If the control determines that the cursor K can be displayed within the display screen, i.e., YES in step S61, then the control proceeds to S53.

If it is determined that the cursor K cannot be displayed within the display screen, i.e., NO, in step S61, an X position is obtained by adding the width Xd of the display screen to the X position at the beginning of the display area, at step S49. This determined position is defined as a new X position in step S62, and a decision is made as to whether the cursor K can be displayed within the newly set display area. Thus, steps S61 and S62 are repeated until the cursor K is in a position which can be displayed within the display area.

When the enlargement display flag is ON, i.e., YES in step S41, and the cursor K is on the head of the line, i.e., YES in step S46, the X position of the starting character in the display layout position information is set in step S50, as the X position at the beginning of the display. When the cursor K is not at the head of the line, i.e., NO in step S46, the position determined as the quantity of the X position of the cursor K minus one-half the width Xd of the display screen. It is represented in step S51, as the X position of the beginning of the display, in order to place the cursor K in the center of the display screen.

The initializing of parameter information for the printing process in the parameter memory 62 is executed in step S53. In other words, the start address for the print layout position information, which is stored in the layout position information memory 63, is set to the start address pointer value SP of the parameter memory 62. The next address of the end address, i.e., end address for the print layout position information stored in the layout position information memory 63 plus two (2) is set as the end address pointer value EP. The data count value DC is then initialized to zero.

Each pointer for character codes, X positions, Y positions, character widths, format data and text data within the layout position information memory 63 have two (2) bytes. Next, the search address data, which is obtained by adding 12-times of the data count value DC to the start address, is loaded or read in step S54. For example, for end address EP at least code "G"; X position "X7"; Y position "Y7"; character width "W7"; format data "Format Data 2"; and pointer "18" are loaded or read. The process then determines, at step S55, whether the text data associated with the read data is within the display area that was set at steps S48, S49, S50 or S51.

The determination step S55 will be described in detail below. When the conditions A and B are satisfied, step S55 determines that the read text data is within the set display area:

A: set X position of the beginning of the display<(display layout X position of the read data+character width of the display layout position information of the read data); and B. (set X position of the beginning of the display+width of display screen, i.e., X position at right edge of the display screen)>display layout X position of the read data.

When the cursor K is positioned on character data "C" of a character string "ABCD", as shown in FIG. 16, and the enlargement display mode is set, the display area is set so the character data "C" is in the center of the display screen. Moreover, if character data "B" has been already read at step S54, an X position X0 of the beginning of the display is smaller than the sum of a display layout X position X1 of the character data "B" plus (+) an X position X2 of a character width W2 of the character data "B." Further, since the sum of the X position X0 at the beginning of the display plus (+) an X position X10 of the width of the display screen is larger than the display layout X position X1 of the character data "B", the character data "B" is determined as within the set display area in step S55.

Thus, when conditions A and B are satisfied, the read data is determined as within the display area, i.e., YES in step S55. Thereafter, a display image about the data is generated in steps S56 and S57.

However, when one of the conditions C and D is satisfied, the read text data is determined as being beyond the set display area:

C: set X position of the beginning of the display≧(X position for the display character layout of the read data+character width of display layout position information of read data); or D: set X position of beginning of the display+width of display screen, i.e., X position of the right edge of the display screen)≦display layout X position of the read data.

When the cursor K is positioned on character "C" of a character string "ABCD", as shown in FIG. 17, and an enlargement display mode is set, the display area is set so the character "C" is in the center of the display screen. If character "A" has been already read at step S54, then the character "A" is determined as beyond the set display area, because an X position X0 at the beginning of the display is larger than the sum of a display layout X position X1 for the character data "A" plus an X position X2 of a character width W1 of the character data "A."

When the conditions C and D are satisfied, the read data is determined as outside of the display area, i.e., NO in step S55. Thus, the generation of a display image, at steps S56 and 57 is skipped, and the control proceeds to step S58.

When the display image generating process has started, the print character size contained in the format data of the first-read data is converted, in step S56, to a display character size based on a character size convert table. For example, as shown in FIG. 11, the print character size SZ for character "A" in the format data 1 is set to 48 dots. Thus, the display character size for character "A" is converted to 16 dots, based on the character size convert table shown in FIG. 12, for a normal display mode, and 32 dots, for an enlargement display mode.

However, since the height of the display 22 is 32 dots, the maximum display character size is 32 dots for the enlargement display mode. Therefore, even if the print character size SZ is set to 64 dots or 48 dots, the size can only be converted to 32 dots, based on the character size convert table for the enlargement display mode. Thus, if the print character size SZ is over 48 dots, the size SZ is always converted to 32 dots in the enlargement display mode. It is therefore difficult to recognize the original size of the character, if the size is set to over 48 dots in the enlargement display mode. However, since the X position and the character width W in the display layout position information are determined based on the print layout position information, spaces displayed between characters on the display screen vary depending on the size set. Therefore, an operator can recognize the original size from the difference in a space between the characters.

The display dot pattern data for the characters' and symbols' display character size is read in step S57 from CGROM 53, based on the determined display character size, character codes and format data, and stored in the display data buffer 64.

Thereafter, a data count value DC is incremented by one in step S58. If the search address, which sums the current address pointer value (current address) CP determined at step S54 and a value twelve times of the data count value DC is not equal to the address indicated by the end address pointer value EP, i.e., NO in step S59, the process returns to step S54 where the search address data determined at step S54 is read.

Conversely, if the search address is equal to the address, i.e., YES in step S59, the display dot image data, which is developed and stored in the display data buffer 64, is output to a video RAM 24 for display on a display screen 22 in step S60. Thereafter, the control is terminated, and the control returns to the print image display process, step S2.

The display control operation will be explained. As shown in FIG. 8, the character string "EFG", in a 24 dot size, is displayed as a 7 dot size in the standard display mode. Therefore, the characters on the display might be too small to be recognized by an operator. In this case, if the enlargement display key is operated after the cursor K has been shifted to the head of the line of the character string "EFG," the line of the character string "EFG" will be enlarged to a 16 dot size for display. Further, the enlargement display guidance will be shown on the display screen.

According to the invention, the display character size is set to be proportional to the print character size. Therefore, the operability of the device is easier. Further, it is easier for an operator to recognize the printed characters on the display screen.

If the displayed character is too small to be clearly seen on the display screen, the enlargement display key can be operated. The display character size is then enlarged and displayed. Therefore, a character can be displayed with an enlarged large size on the display screen 22, as needed. Accordingly, the invention makes it easier to recognize the printed result of characters on the display, and improves the operability of the device. Moreover, when the displayed character is small in size or when a plurality of lines of data are input, the desired character can be enlarged and displayed, thereby enhancing the operability of the device.

Moreover, since the enlargement display guidance is shown on the display screen, it is easier to recognize whether the current display mode is a normal display mode or an enlargement display mode.

Figure 14:
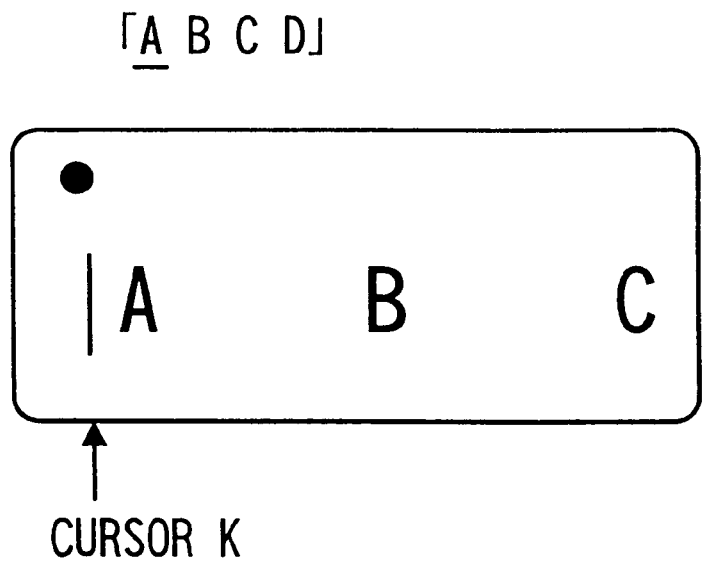
FIG. 14 is a diagram illustrating an enlarged display from the head of the line.
Figure 15:
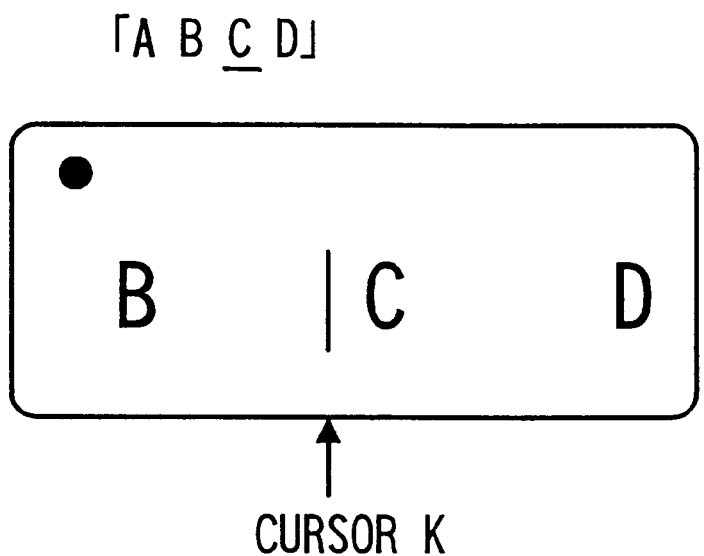
FIG. 15 is a diagram illustrating an enlarged display in the middle of the line.

If the enlargement display key is operated when the cursor K is positioned on the head of the line, as shown in FIG. 14, the cursor K remains on the head of the line, even in the enlargement display mode. On the other hand, if the enlargement display key is operated when the cursor K is in the middle of a line, as shown in FIGS. 15–17, the cursor K is displayed in the center of the display screen 22 in the enlargement display mode. Thus, it is therefore possible to enlarge and easily recognize the characters next to the cursor K.

The line on which the cursor is located is the area to be enlarged. However, a block where the cursor is located may also be the area to be enlarged. Alternatively, a character where the cursor is located may be set to be enlarged. Further, the display dot image data may be generated from the print dot image data based on the predetermined rules such as the thinning-out process.

While this invention has been shown and described for its specific embodiment, it will be apparent to those skilled in the art that changes and modifications can be made within the spirit of this invention.

What is claimed is:

1. A data processing device, comprising:

input means for inputting alphanumeric or symbolic characters and various commands;

data memory means for storing data for input characters;

display means having a predetermined and fixed display screen size for displaying input characters;

font memory means for storing pattern data for a plurality of characters;

image data generation means for generating display image data for characters stored in said data memory means for display on said display means a print image of the input characters, a display character size of said display image data proportional to a print character size, and for generating print image data for characters stored in said data memory means for printing a print image of the input characters;

enlargement area setting means for setting an area of data stored in said data memory means to be enlarged for displaying;

size setting means for setting an enlarged display character size for display on said display means, wherein said enlarged display character size is proportional to said print character size up to a predetermined print character size and said enlarged display character size is set to a maximum size based on said predetermined and fixed display screen size when said print character size is greater than said predetermined print character size;

enlargement image data generation means for generating enlargement display image data for the data set by said enlargement area setting means based on the enlarged display character size set by said size setting means;

display data buffer means for storing the display image data generated by said image data generation means and the enlargement display image data generated by said enlargement image data generation means;

display control means for displaying characters on said display means based on the enlargement display image data stored in said display data buffer means; and image display mode setting means for setting an image display mode when said display image data is generated by said image data generation means, where said enlargement image data generation means sets said area of data during said image display mode.

2. A data processing device according to claim 1, wherein said enlargement area setting means sets the data to be enlarged for a line of characters.

3. A data processing device according to claim 1, wherein said enlargement area setting means sets the data to be enlarged for a character.

4. A data processing device according to claim 1, wherein said enlargement area setting means sets the data to be enlarged for a block of characters.

5. A data processing device according to claim 1, wherein said display control means displays a cursor in a center of a display area of said display means, when the enlargement display image data is displayed on said display means.

6. A data processing device according to claim 1, wherein said image data generation means for generating display image data for characters stored in said data memory is based on the pattern data stored in said font memory means, and said enlargement image data generation means for generating enlargement display image data for the data set by said enlargement area setting means is based on the pattern data stored in said font memory means.

7. A data processing device according to claim 1, wherein said enlargement image data generation means generates enlargement display data with a maximum size so that the enlargement display image data can be displayed within a display area of said display means, if the enlargement image display data generated with the size set by said size setting means cannot be displayed within the display area of said display means.

8. A data processing device according to claim 1, wherein said display control means displays a cursor at a left-most side of the display area of said display means when the cursor is located at a head of a line which has been set as an area to be enlarged by said enlargement area setting means.

9. A data processing device according to claim 1, further comprising means for indicating that said enlargement image data generation means has been executed.

10. A data processing device according to claim 1, further comprising means for storing a plurality of sizes of dot pattern data of a plurality of characters and means for generating the enlarged display image data by reading from a dot pattern data having an appropriate set size.

11. A method for processing data, comprising:

inputting alphanumeric or symbolic characters and various commands;

storing data for input characters;

displaying input characters on a display having a predetermined and fixed display size;

storing pattern data for a plurality of characters;

generating print image data for printing a print image of the stored input characters;

generating display image data for displaying said print image of the stored input characters, a display character size of said display image data proportional to a print character size of said print image data;

setting an area of data stored to be enlarged for display;

setting an enlarged display character size for display, wherein said enlarged display character size is proportional to said print character size up to a predetermined print character size and said enlarged display character size is set to a maximum size based on said predetermined and fixed display screen size when said print character size is greater than said predetermined print character size;

generating enlargement display image data for the data set to be enlarged based on the enlarged display character size set;

storing the display image data and the enlargement display image data;

displaying characters based on the enlarged display image data; and setting an image display mode when said display image data is generated, where said enlargement display image data is generated during the image display mode.

12. A method according to claim 11, further comprising setting the data to be enlarged for a line of characters.

13. A method according to claim 11, further comprising setting the data to be enlarged for a character.

14. A method according to claim 11, further comprising storing a plurality of sizes of dot pattern data of a plurality of characters and generating the enlarged display image data by reading from a dot pattern data having an appropriate set size.

15. A method according to claim 11, further comprising setting the data to be enlarged for a block of characters.

16. A method according to claim 11, further comprising displaying a cursor in a center of a display area when the enlargement display image data is displayed.

17. A method according to claim 11, wherein the generating of display image data for characters stored for displaying a print image of the input characters is based on the stored pattern data and the generating of enlargement display image data for the data set to be enlarged is based on the stored pattern data.

18. A method according to claim 11, wherein generating enlargement display data with a maximum size so that the enlargement display image data can be displayed, if the enlargement image display data generated with the size set cannot be displayed within a display area.

19. The method according to claim 11, further comprising displaying a cursor at a left side of the display area when the cursor is located at a head of a line which has been set as an area to be enlarged.

20. The method according to claim 17, further including indicating that said generating enlargement image data has been executed.

21. The data processing device of claim 1, where the display control means displays characters on the display means further based on the display image data stored in said display data buffer.

22. The data processing device of claim 1, where the display control means displays the characters of the area of data set by said enlargement area setting means over an entire display area of the display means based on the enlargement display image data.

23. The data processing device of claim 1, where a width of said display size of said display means corresponds to a width of a printing medium where said input characters are printed.

24. The method of claim 11, where the step of displaying characters is further based on the display image data.

25. The method of claim 11, where the step of displaying characters displays the characters of said area of data over an entire display area.

26. The method of claim 11, where a width of said predetermined display size corresponds to a width of a printing medium where said input characters are printed.

27. A tape printing device, comprising:

input means for inputting alphanumeric or symbolic characters and various commands;

data memory means for storing data for input characters;

display means for displaying input characters, said display means having a predetermined and fixed size;

font memory means for storing pattern data for a plurality of characters;

image data generation means for generating display image data for characters stored in said data memory means for display on said display means a print image of the input characters, said print image having a print size;

enlargement area setting means for setting an area of data stored in said data memory means to be enlarged;

size setting means for setting an enlargement display size to be displayed on said display means, where the enlargement display size is proportional to said print size up to a predetermined print size and said enlargement display size is set to a maximum size based on said predetermined and fixed display size when said print size is greater than said predetermined print size;

enlargement image data generation means for generating enlargement display image data for the data set by said enlargement area setting means based on the enlargement size set by said size setting means;

display data buffer means for storing the display image data generated by said image data generation means and the enlargement display image data generated by said enlargement image data generation means; and display control means for displaying characters on said display means based on the display image data or the enlargement display image data stored in said display data buffer means.

28. A tape printing device, comprising:

input means for inputting alphanumeric or symbolic characters and various commands;

data memory means for storing data for input characters;

display means having a predetermined and fixed display size for displaying input characters;

font memory means for storing pattern data for a plurality of characters;

image data generation means for generating display image data for characters stored in said data memory means for display on said display means a print image of the input characters, a display character size of said display image data proportional to a print character size, and for generating print image data for characters stored in said data memory means for printing a print image of the input characters;

enlargement area setting means for setting an area of data stored in said data memory means to be enlarged for displaying;

size setting means for setting an enlarged display character size for display on said display means, wherein said enlarged display character size is proportional to said print character size up to a predetermined print character size and said enlarged display character size is set to a maximum size based on said predetermined and fixed display size when said print character size is greater than said predetermined print character size;

enlargement image data generation means for generating enlargement display image data for the data set by said enlargement area setting means based on the enlarged display character size set by said size setting means;

display data buffer means for storing the display image data generated by said image data generation means and the enlargement display image data generated by said enlargement image data generation means;

display control means for displaying characters on said display means based on the enlargement display image data stored in said display data buffer means; and image display mode setting means for setting an image display mode when said display image data is generated by said image data generation means, where said enlargement image data generation means sets said area of data during said image display mode.

* * * * *